US010867321B1

(12) United States Patent
MacDonald-Korth et al.

(10) Patent No.: US 10,867,321 B1
(45) Date of Patent: Dec. 15, 2020

(54) AUTOMATIC LOGIN LINK FOR TARGETED USERS WITHOUT PREVIOUS ACCOUNT CREATION

(71) Applicants: James D MacDonald-Korth, Portland, OR (US); Rita I MacDonald-Korth, Portland, OR (US)

(72) Inventors: James D MacDonald-Korth, Portland, OR (US); Rita I MacDonald-Korth, Portland, OR (US)

(*) Notice: Subject to any disclaimer, the term of this patent is extended or adjusted under 35 U.S.C. 154(b) by 242 days.

(21) Appl. No.: 16/036,769

(22) Filed: Jul. 16, 2018

(51) Int. Cl.
*G06Q 30/02* (2012.01)
*H04L 29/06* (2006.01)
*G06F 16/955* (2019.01)

(52) U.S. Cl.
CPC ..... *G06Q 30/0255* (2013.01); *G06F 16/9558* (2019.01); *G06Q 30/0201* (2013.01); *G06Q 30/0246* (2013.01); *H04L 63/101* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 5,740,549 | A | 4/1998 | Reilly et al. | |
|---|---|---|---|---|
| 6,662,177 | B1 | 12/2003 | Martino et al. | |
| 6,879,965 | B2* | 4/2005 | Fung | G06Q 20/10 235/379 |
| 7,016,853 | B1* | 3/2006 | Pereless | G06F 16/951 705/1.1 |
| 7,490,242 | B2* | 2/2009 | Torres | H04L 63/0815 380/281 |
| 7,702,578 | B2* | 4/2010 | Fung | G07F 7/00 705/39 |
| 8,495,210 | B1 | 7/2013 | Natarajan et al. | |
| 8,694,607 | B2 | 4/2014 | Darnell et al. | |
| 8,725,683 | B2 | 5/2014 | Dickinson et al. | |
| 9,049,259 | B2* | 6/2015 | Rathod | G06Q 50/01 |
| 9,635,556 | B2* | 4/2017 | Afzelius | H04W 12/0804 |
| 2002/0055909 | A1* | 5/2002 | Fung | G07F 7/00 705/42 |
| 2003/0233441 | A1 | 12/2003 | Nishiyama et al. | |
| 2004/0210771 | A1* | 10/2004 | Wood | G06F 21/31 726/8 |
| 2004/0230536 | A1* | 11/2004 | Fung | G06Q 40/00 705/64 |

(Continued)

FOREIGN PATENT DOCUMENTS

EP    2144401 B1    9/2013

*Primary Examiner* — Alan S Miller
(74) *Attorney, Agent, or Firm* — FisherBroyles, LLP; Micah D. Stolowitz

(57) ABSTRACT

An auto-login system and process enable maintaining user accounts on a server without a user having to register or create a user name, password, or other authentication method. An account may be created without user knowledge. The server may transmit a content item to a target user, along with a link. A server identifies the target user from use of the auto-login link and collects interaction or "engagement" data while the user is logged in, to assess user interest in products, for example, a mutual fund investment product, which may be characterized by tags and/or categories. The system may quantify a product salience metric for a given product relative to a target user's interest profile to focus marketing efforts and support engagement with interested target users, especially securities funds and financial advisors.

20 Claims, 9 Drawing Sheets

(56) References Cited

U.S. PATENT DOCUMENTS

| | | | |
|---|---|---|---|
| 2004/0230566 A1* | 11/2004 | Balijepalli | G06F 16/954 |
| 2005/0131815 A1* | 6/2005 | Fung | G07F 7/00 |
| | | | 705/39 |
| 2005/0177731 A1* | 8/2005 | Torres | H04L 67/02 |
| | | | 713/182 |
| 2006/0098624 A1* | 5/2006 | Morgan | H04L 65/1006 |
| | | | 370/352 |
| 2006/0101098 A1* | 5/2006 | Morgan | H04L 65/4007 |
| 2007/0038931 A1 | 2/2007 | Allaire et al. | |
| 2007/0128899 A1* | 6/2007 | Mayer | G06F 9/4406 |
| | | | 439/152 |
| 2007/0276527 A1* | 11/2007 | Chen | G06Q 10/00 |
| | | | 700/96 |
| 2009/0076887 A1 | 3/2009 | Spivack et al. | |
| 2009/0112837 A1 | 4/2009 | Modani et al. | |
| 2009/0125991 A1* | 5/2009 | Torres | H04L 63/0815 |
| | | | 726/5 |
| 2010/0241711 A1* | 9/2010 | Ansari | G05B 15/02 |
| | | | 709/205 |
| 2012/0303418 A1 | 11/2012 | Poreh | |
| 2013/0317899 A1* | 11/2013 | Shiely | G06Q 30/0185 |
| | | | 705/14.26 |
| 2014/0004854 A1* | 1/2014 | Veran | H04W 8/02 |
| | | | 455/432.1 |
| 2014/0129942 A1* | 5/2014 | Rathod | H04N 21/44222 |
| | | | 715/720 |
| 2014/0335480 A1* | 11/2014 | Asenjo | G06Q 10/06 |
| | | | 434/107 |
| 2014/0344907 A1* | 11/2014 | Wan | H04L 63/083 |
| | | | 726/6 |
| 2017/0024473 A1* | 1/2017 | Angulo | G06F 16/9566 |
| 2017/0230354 A1* | 8/2017 | Afzelius | H04L 9/30 |
| 2020/0019598 A1* | 1/2020 | Barker | G06F 40/166 |

* cited by examiner

300

CHARACTERISTICS AND
INVESTMENT BEHAVIORS

| | 1 | 2 | 3 | 4 |
|---|---|---|---|---|
| A | 302 | | | |
| B | | 304 | | |
| C | | | | | ← 308
| D | | | | |

TARGET FUNDS OR CATEGORIES

CHARACTERISTICS

| | 1 | 2 | 3 | 4 |
|---|---|---|---|---|
| L | | | | | ← 430
| M | | | | |
| N | | | | |
| O | | | | |

SELECTED PRODUCTS

FIG. 4

EXAMPLE ALGORITHM LOGGING USER BEHAVIOR DATA

AUTOMATIC LOGIN LINK FOR TARGETED USERS WITHOUT PREVIOUS ACCOUNT CREATION

COPYRIGHT NOTICE

© James D. MacDonald-Korth and Rita I. MacDonald-Korth 2018. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

FIELD OF THE INVENTION

The disclosure that follows relates to electronic communications, especially utilizing electronic mail (email) and the internet, and more specifically to automatic login, data collection and data analysis useful in targeting electronic communications.

BACKGROUND

Many types of businesses use electronic communication with their clients and/or prospective clients and may drive that communication using data analysis and machine learning techniques to manage that communication. As data analysis and machine learning has become more sophisticated, more tasks have become accessible to these methods. Databases have likewise become increasingly sophisticated, and it is now possible to collect massive quantities of data in order to track and monitor any quantifiable phenomena at a high resolution and, moreover, apply machine learning techniques to leverage that data to make useful predictions.

Interaction between businesses and clients has become dominated by electronic interactions in the last few years. Businesses often have information that is confidential or customized for a particular client and needs to be protected from unauthorized access by other parties. To verify that a client is who they say they are, businesses typically require each client to create an account with a unique login name and password. This requirement can create a hurdle for interacting with many clients, especially those where no prior relationship exists. The need remains for improvements in interactions with clients and potential client or customers to improve relations and reduce friction in business operations.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a server may be provisioned for data store access and electronic communications over a network, for example, the internet. A "server" is used in a general sense; it may comprise one or more computers or processors, which may be networked locally and/or "in the cloud." A server, as discussed herein, may host software as a service (SaaS). The server may execute software or "code" to carry out various process steps.

In one embodiment, the steps may involve selecting a content item stored in a data store accessible to the server. The content item may be, for example, a text or multi-media document or file. The process further calls for accessing a list of target users also stored in a data store accessible to the server, wherein the list of target users includes at least a corresponding email address or other unique identifier associated with each of the users. The listing of target users may be maintained, updated, filtered, queried, etc. using various technologies, especially database technologies.

Some operations further call for selecting a user on the list of users and generating a custom html link (or URL or equivalent token) that identifies a corresponding target web page or content item on the server, wherein the target web page is associated with the selected user and with the content item. The custom link may be inserted into a content item, for example, a digital newsletter, to form a custom content item. In some embodiments, the content item (without modification) may be attached to a message, for example, an email, and the custom link may be inserted into the email message (body). The email message may have instructions for the user to follow the link. The system transmits the custom content item (email message) to the selected user.

Subsequently, the server may receive an external access to the target web page, for example, from a remote web browser over the internet, indicating that the selected user activated or "clicked" the link to the corresponding web page. The system may then identify a corresponding user based on the web page accessed. That is, identify the user associated with the target web page. In response, the system logs in the identified user to the server (or more specifically, to a web site or other resource hosted on the server) so as to enable access to server resources without requiring the user to enter any account identifier, password or take any other authentication action. This process may be referred to as automatic login or "auto-login."

After auto-login, the system may monitor activity of the identified (auto-logged in) user on the server to acquire behavior information further described below. The behavior data may be stored in the data store in association with the corresponding user. The user activities (or behavior) on the server may include, for example, what is read (content items), when it is read, how long it is read, forwarding an item, and other indicia of interest. This data may be accumulated and stored in a data store, and processed as further described herein, to assess and quantify a level of interest of a given user in selected content.

In more detail, through key words, tags, and/or semantic clustering associated to content items accessed on the server, the user's interests as demonstrated by the stored behavior data may be correlated to a product to assess the user's potential interest in the product. Through the use of auto-login, a target user need not remember any password or other credentials to access the server web site. Indeed, the user need not even be aware of the existence of an account associated with the user on the server.

Additional aspects and advantages of this invention will be apparent from the following detailed description of preferred embodiments, which proceeds with reference to the accompanying drawings.

BRIEF DESCRIPTION OF THE DRAWINGS

FIG. 3 is a simplified conceptual diagram illustrating a database or table of characteristics and/or investment behaviors for a set of target funds.

FIG. 4 is a simplified conceptual diagram illustrating a database or table of characteristics for a set of investment products.

DETAILED DESCRIPTION OF PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this document.

Many businesses use email, short message service (SMS) text messages, or other electronic communication such as Facebook Messenger that allow one-to-one electronic communication to communicate with their customers and potential customers. This communication can be customized for each individual to whom the communication is addressed. While traditional systems may request a user to create an account on a website and enter a particular code, embodiments disclosed herein provide an auto-login feature. This allows a recipient of a targeted communication to simply click on a link and to receive content from a website that was specifically created for them. This eliminates the requirement that a user visit a web site, create an account, and then remember their account name and password to log in and receive the customized content. This can increase the response rate to the messages by minimizing friction and difficulty for a targeted user to respond to the communication.

In some embodiments, an auto-login feature can be used to identify a user through an identifier, such as a user-specific link included in a marketing or update email In some embodiments, the identifier can be used to initiate an authentication session, either visible to or transparent to the user. The session auto-login can provide the same analytics capability as is available from more traditional authentication methods. At least in circumstances where a majority of traffic is driven by direct links from emails or other controlled sources, the auto-login feature of some embodiments is superior to other tracking methods such as cookies, and IP address tracking, in that it provides more consistent tracking, is more likely to associate a user's numerous devices with the right account, is less likely to obfuscate or hide the user's identity and is less likely to be blocked by a user. On the other hand, cookies can also be applied to achieve the benefits of both technologies.

Figure 1:
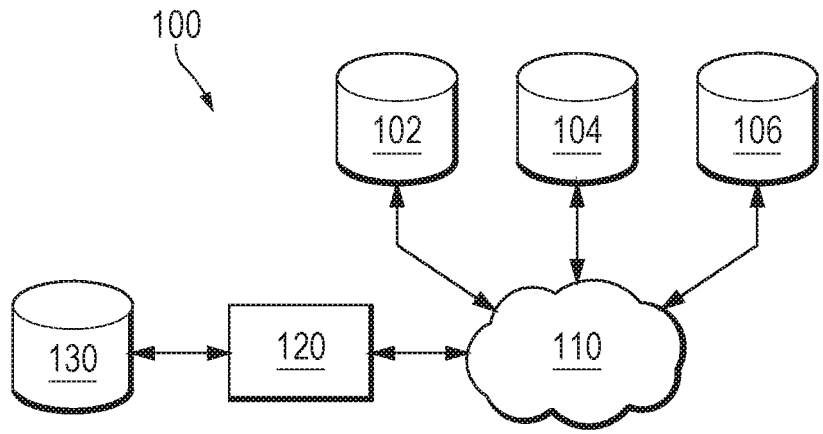
FIG. 1 is a simplified illustration of one example of a system to implement a web site featuring an automatic login link for targeted users without previous account creation.

FIG. 1 illustrates one example of a system to implement a web site featuring an automatic login link for targeted users without previous account creation. In this figure, a server 120 may be provisioned as a web server, utilizing various technologies that are well known. the server is operationally coupled to a network such as the internet, shown as a cloud 110. The server 120 includes or has access to one or more data stores 130 for storing, maintaining and updating data detailed below. Some of the data stored at 130 is kept secure and private. Other data, such as published content, may be accessed by users under control of the server. Data or content items may be accessed by remote users (not shown here), for example, using HTML or similar technologies, further explained below.

The server 120 (which may comprise multiple servers, local, in the cloud, or otherwise distributed) has access to various data sources, for example, via the internet 110 and/or other networks. In one example, the server may be arranged to collect securities industry data. For example, one data source 102 may provide public information such as prospectuses published by mutual funds. Another data source 104, also available over the internet, may comprise a proprietary or subscriber-based service that provides additional data about investment funds, such as recent trading activity, performance data, and holding information. In some embodiments, a more general news source 106 may be utilized. For example, the news source may be searched by server 130 software to acquire news content about a particular investment fund or manager as part of characterizing the same as discussed below.

Another aspect of data store 130 (or a related data store) is to store content items. Content items may include, for example, articles, newsletters, emails, and other kinds of communications, each of which may include various media (text, photos, video) and/or links to other content sources. In an embodiment, an administrator or other person associated with the server system 120 may curate or create original content items and store them in the data store for distribution to a list of users or targets. In some cases, the content may comprise a periodic newsletter. In the example of the securities industry, the newsletter or other content may be crafted for consumption by investment professionals.

One or more key words and/or categories may be assigned to a content item. The assigned key words and/or categories may be stored and associated with the corresponding content item in the data store so as to enable, for example, querying the data store based on key words and/or categories. Preferably, a hierarchical arrangement may define categories, and each key word may be assigned to one or more of the categories. Additional levels of such a hierarchy may be defined. To take a simple example, a gold mutual fund content item, say a gold trading newsletter—may be assigned key word "gold," and it may be further assigned to a category "metals" or "commodities," which in turn may be a sub-category of an equity category of investments. Additional uses of key words and/or categories are described below in the context of analysis of target user behavior and assessing that behavior as an indicator of potential interest in individual products.

Figure 5:
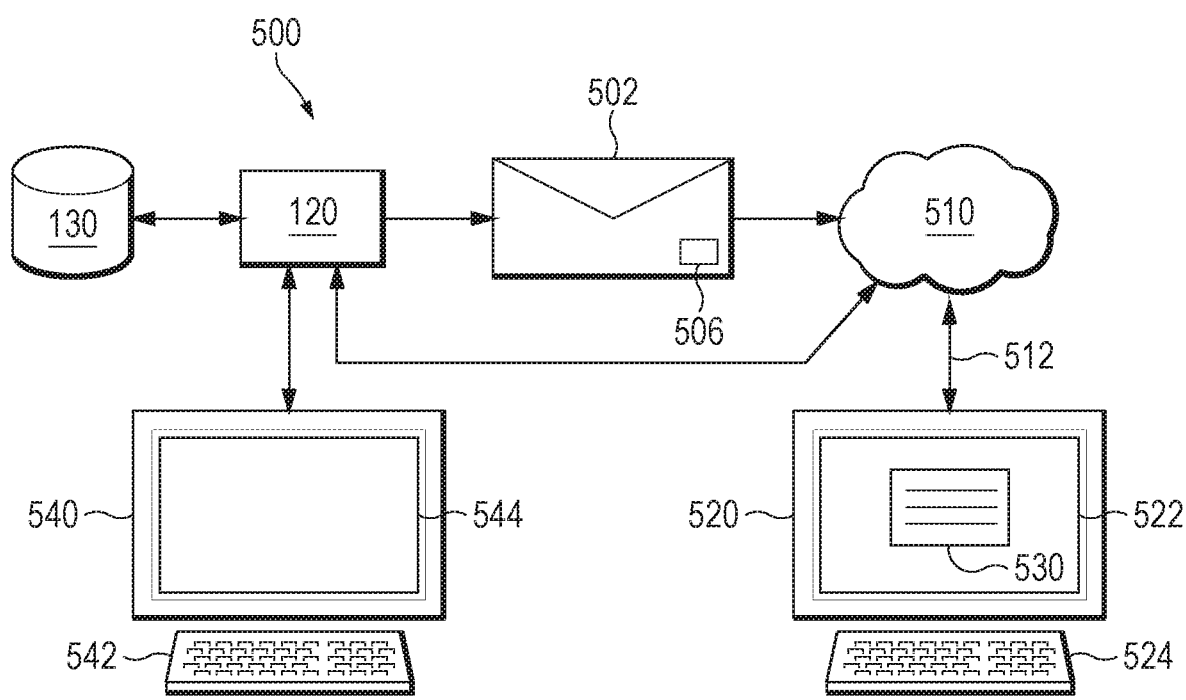
FIG. 5 is a simplified diagram illustrating one implementation of a system for auto-login and user behavior analysis.

FIG. 5 is a simplified diagram illustrating one implementation of a system 500 for auto-login and behavior analysis in support of effectively targeting communications. Here, we see again the server 120 and associated data store 130. A computer or terminal 540 may be coupled to the server 120, for example, over a local network, for administrative work, content item authoring, and other tasks. The terminal 540 may be used to conduct analyses of data stored at 130, for example, the affinity analysis described below. The data store 130 may store a list of users, also called targets or targeted users. Various known database programs or technologies may be used. Additional data, stored in association with corresponding users, is described below. The additional data may include, for example, detailed user engagement data and/or user engagement scores based on the engagement data, further described below. The particular arrangement of data, records, etc. is not critical and will vary in different implementations.

In one example operation, an operator using the terminal 540 and/or server 120 may select a content item, such as a newsletter for publication. The newsletter may be sent, for example, using email, to a list of users (also called a target). These operations may be carried out automatically by the server 120 under software control. In more detail, the server system (or operator) may access a content item stored on the data store 130 and access a list of users stored in a data store accessible to the server, (which may be the same or a distinct data store) wherein the list of users includes at least a corresponding email address (or other unique identifier) associated with each of the users on the list.

For each user on the list, in one embodiment, the server may generate a custom html link (or URL) 506 that identifies a corresponding target (landing) location on the server 120, wherein the target location is associated with the specific user and with the content item. The term "location" here refers to a page or content item on a page of a web site, rather than a geographic location. The server may insert the custom link into the content item to form a custom content item. In another arrangement, the content item (without modification) may be attached to a message, for example, an email, and the custom link may be inserted into the email message (body). The custom content item or email 502 may be transmitted to the corresponding user in the list, for example, using the user's email address. In this way, an email 502 transits the internet 110 and arrives at a user system 520, for example, a computer or mobile device. The email is opened to present the custom content item, including the custom link for the user to access the server 120 over the internet. The email may include directions or remarks related to the custom link, although it need not identify it as a custom link. The user, if interested, may click the custom link to access the corresponding target (landing) location on the server.

On the server side, preferably under programmatic control, the server may detect an external access to one of the target locations. i.e., the result of a user clicking the custom link in their email to direct their browser. Then, based on the target location accessed, the server may identify the corresponding user. The server may then log in the identified user to the server automatically to enable access to server resources without requiring an account identifier, password or other authentication action. The process may include customizing the target location for presentation to the user after login.

In some embodiments an account and default password can be created for each target of the communication using the user's email address, telephone number, or other identifying information related to the user and the account information stored in a database associated with the information known about the target, such as the email address of the target and any other information that has been gathered about the target. This information may include the real name of the target in some embodiments, it but may not include the real name of the target in other embodiments either for privacy reasons or because the real name of the target may not be known. The default password may be stored in the same database, but in some embodiments, the password is not included in the same database as the other information about the target but is encrypted (or hashed) and stored in a separate database that is used during the authentication process. The information customized for the target may also be stored in the database associated with that account in some embodiments.

A uniform resource locator (URL) may be created with a link to the correct world wide web page for authentication with additional characters added to the URL to indicate the account name and password to use for the login process. The URL is then included in the message sent to the targeted user.

In other embodiments no account is created for a targeted user in advance, but a unique code is created for each targeted user and is stored in the database associated with other information about the target. The unique code is embedded into the URL that is sent to the target using email or other one-to-one electronic communication. In response to the user clicking on the URL and launching their browser to load that link, the server uses the unique code to look up the targeted user in the database as well as the information to be presented to that user. The server then formats the information and sends it back to the targeted user. In some embodiments, the fact that the user visited the URL can be used to automatically create an account for that user using known information about the targeted user as the account name. The initial information can be presented to the targeted user whether or not the account is created. In some embodiments, the account can be created for the user the second time that the user visits the link. The account name may be changeable by the user in some embodiments. The user may be prompted to enter a password when the account is created, or alternatively, the user can be asked to enter a password at a later time, such as the second time they log in or in response to the user interacting with the content. In some embodiments where the information targeted for the user is not overly sensitive or confidential, no password is created, and the user can continue to access the website using the link with the URL containing the unique code and/or with their account name.

The information created for the targeted user can be created in any appropriate manner, but in some embodiments the information is created based on information gathered on potential targeted individuals and analysis of that information using artificial intelligence and/or machine learning techniques. Data systems (e.g. SQL or No-SQL databases), having a schema or other structure for storing and querying encoded behavior can be employed to reveal preferences and provide critical planning and prediction capability. Below we describe processing of interaction behavior data through various techniques to enable data queries based on a demonstrated interest, as revealed by engagement and user interaction with particular content as further described below.

Figure 2A:
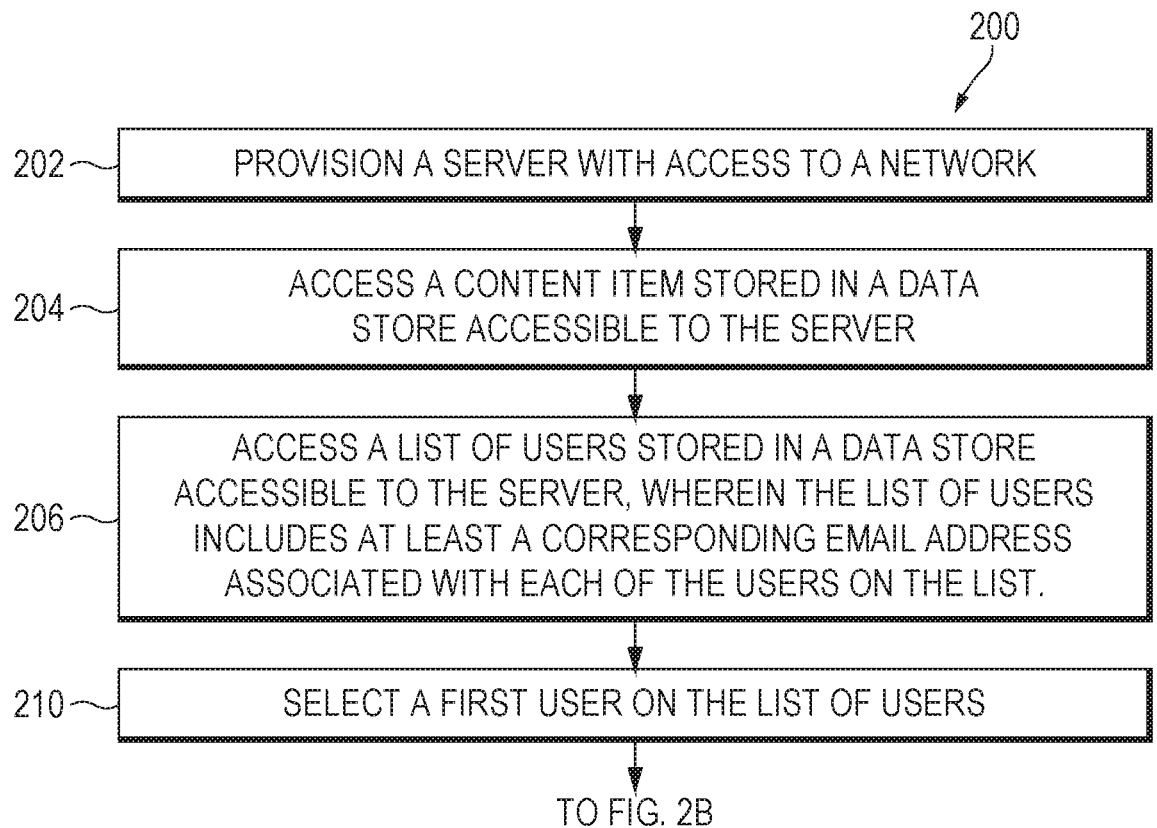
FIGS. 2A-2B together form a simplified flow diagram showing some of the principle steps of a process consistent with the present disclosure.
Figure 2B:
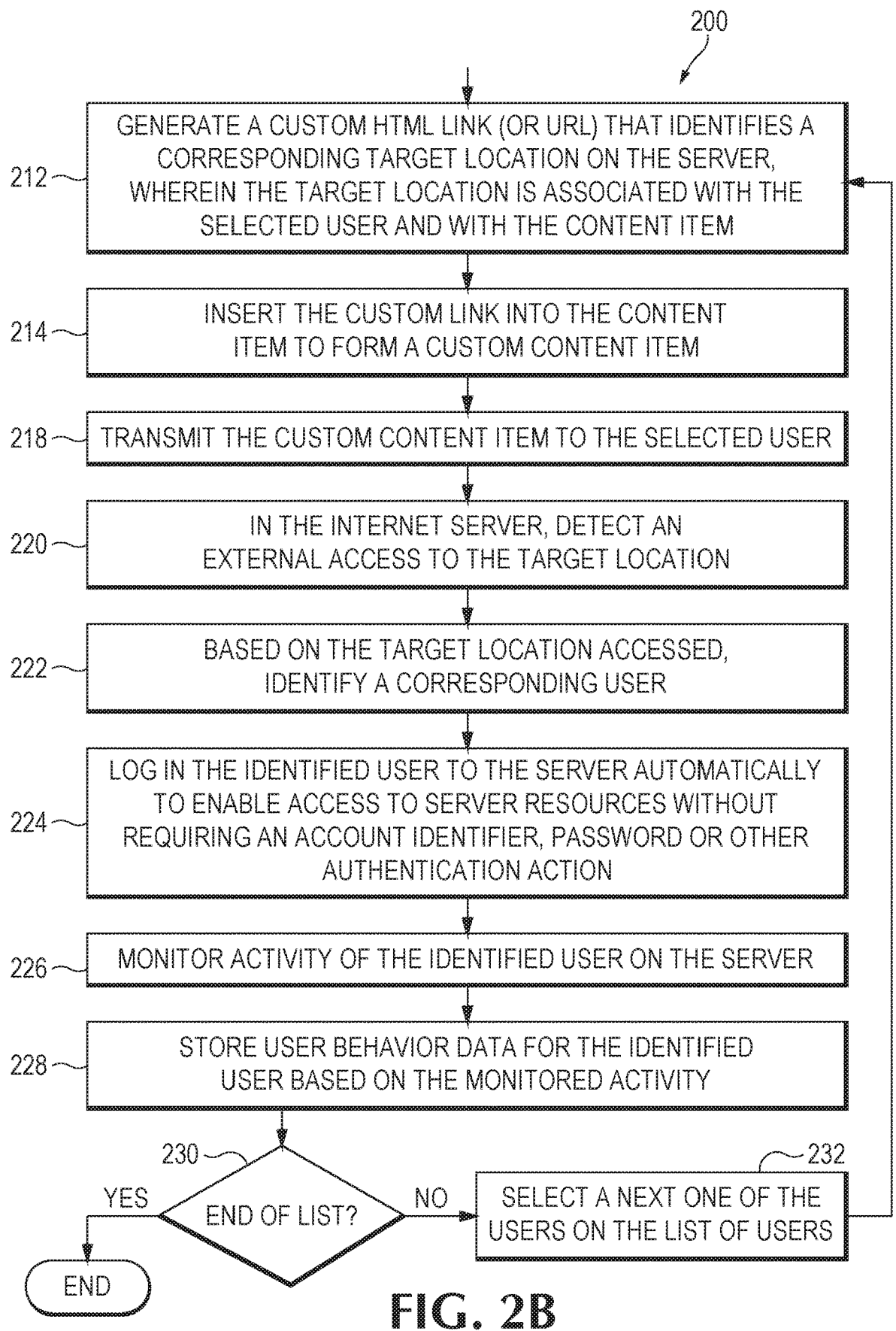

FIGS. 2A-2B together form a simplified flow diagram illustrating some of the principle steps of a process consistent with the present disclosure. Some of these steps were introduced above. Referring to FIG. 2A, at step or block 202, a process may begin, at block 202, by provisioning a server with access to a network. At 204, accessing a content item stored in a data store accessible to the server. At 206, accessing a list of users stored in a data store accessible to the server, wherein the list of users includes at least a corresponding email address associated with each of the users on the list. The list may use contact information other than email address, for example, a social media identifier or address.

At block 210, selecting a first user on the list of users. Referring now to FIG. 2B, at block 212, generating a custom html link (or URL or equivalent token) that identifies a corresponding target location on the server, wherein the target location is associated with the selected user and with the content item. Continuing at block 214, inserting the custom link into the content item to form a custom content item. In some embodiments, as noted, the content item (without modification) may be attached to a message, for example, an email, and the custom link may be inserted into the email message (body). The email message may have instructions for the user to follow the link.

At block 218, transmitting the custom content item (email message) to the selected user. Continuing at block 220, in the server, detecting an external access to the target location. At 222, based on the target location accessed, identify a corresponding user. That is, identify the user associated with the target location. Then, at block 224, log in the identified user to the server automatically to enable access to server resources without requiring the user to enter any account identifier, password or take any other authentication action.

Continuing at block 226, monitoring activity of the identified (auto-logged in) user on the server. Next, at Block 228, is storing user behavior data for the identified user based on the monitored activity. As mentioned, the user activities (or behavior) on the server may include what is read (content items), when it is read, how long it is read, forwarding an item, and other indicia of interest. This data may be accumulated and stored in a data store, and processed as further described herein, to assess and quantify a level of interest of a given user in selected content. Decision 230 determines whether the end of the user list has been reached. If so, this process may end. If not, block 232 calls for selecting a next one of the users on the list and looping back to block 212 to generate a custom link and proceed to contact the next user on the list. In this illustration, users are contacted one at a time, working through an initial user list. In some embodiments, the process may be parallelized, for example, so that separate threads operate to contact users and collect data in parallel.

Marketing Securities

Marketing securities to financial advisors has traditionally required salespeople to contact an extremely large number of "cold" leads in order to establish a relationship, build rapport, and mutually determine whether any of the offered products would be appropriate for inclusion in the financial advisor's investment strategy. The process of contacting cold leads is time-consuming and requires a great amount of skill, diligence, and patience from the salespeople.

Information regarding each financial advisor's investments are periodically available as public information. Additionally, behavior information is obtainable from public or proprietary sources to give insight into the decision processes and types of investments that are likely to be relevant to each financial advisor's investment strategies. This type of data may be collected and stored in machine-usable form such as a database or data store as illustrated in FIG. 1, for example. FIG. 3 is simplified conceptual diagram illustrating a database or table of characteristics and/or investment behaviors for a set of target funds. Each target fund (or manager) is represented by a corresponding row A, B, C etc. in the table 300. Each characteristic and investment behavior for the fund is represented by a corresponding column, numbered 1, 2, 3 etc. in the table. For example, cell 302 contains data for characteristic "1" of fund "A" and cell 304 contains data for characteristic (or behavior) "2" for fund "B". These characteristics in practice may have many parts and sub-parts, for example, fund holdings or performance data. Some other characteristics of a fund may include its size (total assets), fees, management, trading behavior such as transaction (block) sizes, and timing. For example, does a fund mostly purchase assets in Q1 and sell in Q3? This simple fact, among others, may influence selection of most promising leads at a given time for marketing a fund, as further explained below.

User (for example, financial advisor) subject matter interests, as reflected in captured behaviors, are likewise multi-faceted. The data for a given fund, say row C fund, may be assembled into a vector 308 for analysis and comparison to investment products. The data can also be used to form part of a dataset for modeling the fund as discussed with regard to FIG. 8A. Preferably, a dataset for a fund or financial advisor includes both objective characteristics and behavior data.

FIG. 4 is a simplified conceptual diagram illustrating a database or table of characteristics for a set of investment products. In this table 400, selected products' data are stored in corresponding records or rows identified by letters "L" "M" "N" etc. Each cell may have many sub-parts or links to another table. Fund "L" for example is represented by a vector 430 which may facilitate comparison to other funds or managers. In more detail, corresponding elements of the vector may be scored, scaled, and used to find an overall score for several applications as further described below.

It is a benefit provided by some of the presently disclosed embodiments to qualify or rank a list of cold leads based on observed behavior (e.g. investment history, content consumption data, investment class, subject matter expertise or interest, etc.). In some embodiments this qualification or ranking allows for the creation of a reduced list of targeted "warm" leads. In some embodiments, this filtering is accomplished by applying artificial intelligence ("AI"), Machine Learning ("ML"), and/or statistical methods to map observations data to offered investment data. The production of a warm leads list solves the identified problems relating to cold calling and is an advantage provided by some embodiments.

Some embodiments enable salespeople to be much more efficient with their sales strategies and allows efficient identification of the financial advisor's relevant interests. Using the warm leads list generated in certain embodiments accelerates the creation of rapport and identifies what are likely to be the particular benefits of a given product to a given financial advisors. The increased success rate benefits the motivation and efficiency of sales staff and avoids the ill will or other negative associations that may arise in the mind of a potential customer from cold calling to discuss an irrelevant product.

Investment products are often niche products appealing to a limited number of financial advisors. Marketing securities broadly to financial advisors via print or online ads has typically resulted in an extremely low number of conversions per impression. Even where other methods of online targeting by profile have been used (e.g. Google AdWords, Facebook Ads, etc.), the identity information has proven to be too general, and the mappings to fund information too imprecise to accurately predict market interest in securities. The fatigue felt by financial advisors reviewing content containing such advertisements reduces the overall effectiveness of this method of advertising and also degrades the value of the website or publication bearing the advertisements in the mind of such managers.

Just as financial advisors have limited amounts of attention, so do their clients. For a financial advisor to be successful, it is important to target users with specific advertisements or offers based on client interest. No suitable technology to make these identifications exists in the field of securities. Specific considerations come into play in the financial products market that are not present in other markets. For example, in order to avoid wasting a client's time, a financial advisor needs to provide funds that are relevant to the client's interests. Moreover, as a further example, financial advisors in some jurisdictions are subject to fiduciary responsibilities to their clients. It is important, therefore, that they are made aware of products similar to their present or anticipated holdings that may have similar or identical performance characteristics but lower fees.

The ability to directly target mangers with funds highly relevant to their and their clients' investment strategies and areas of expertise would be of great benefit to both publishers and advertisers. Moreover, the ability to refrain from delivering advertisement when no offered product is of sufficient relevance to a particular reader of a publication would be a substantial improvement and overcome the aforementioned disadvantages of prior advertising methods. Systems and methods of the type disclosed herein may be used to overcome these disadvantages.

Affinity Mapping

In some embodiments, an affinity map may be created based on, at least in part, observation of behavior of a particular individual or a population. The affinity map may consider one or a number of factors such as: semantic clusters of content selected by the target population or individual; extrinsic tags associated with the content either through statistical methods or otherwise associated with the content; the order of review of content; review by the same target of additional content in identical or similar semantic clusters; review by the same target of additional content having identical or similar extrinsic tags; the timing and/or frequency of the review of related content (e.g. related through semantic clusters or extrinsic tags); frequency of review of the same content; the presence or absence of feedback provided by the user; the content of feedback provided by the user; the frequency of review of related resources (e.g. electronic messages related to relevant content); and other similar observed behaviors.

In some embodiments, much of this data may be collected by the server 120 of FIGS. 1 and 5. The server may host a web site containing various content items. The content items may be sent to users along with automatic login links as described above. The content items may be included in an initial email or provided in response to the user clicking on the custom URL, or a combination thereof. Once the user is logged into the server, user behavior on the server, including the actions described above, can be monitored and logged, even though the user has not "logged in" in the traditional fashion. The user need not be aware that she has an account on the server. The user behaviors may include some or all of the aspects mentioned in the preceding paragraph. In particular, the timing and sequencing of user activity (for example, reviewing content) is easily logged using timestamps, and any or all user behavior may be stored (say in data store 130) in association with the user account.

Figure 6:
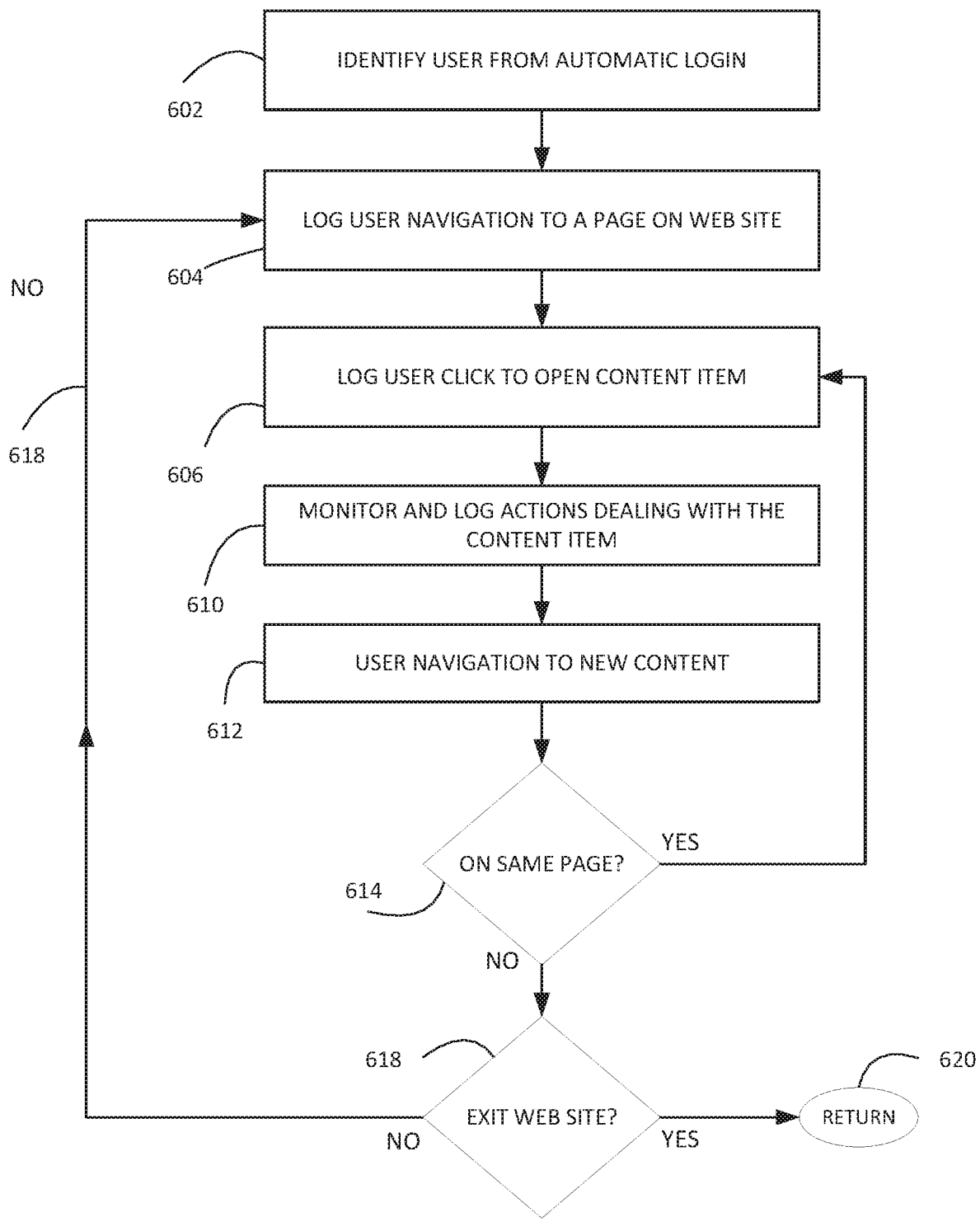
FIG. 6 is a simplified process diagram illustrating a method for logging user behavior for assessing user interests.

FIG. 6 a simplified process diagram illustrating a method or algorithm for logging user behavior to form behavior data. In some embodiments, this process may correspond to block 226 in FIG. 2B; "MONITOR ACTIVITY OF THE IDENTIFIED USER ON THE SERVER." First, a user is logged into the server, and identified by an automatic login process, block 602. In some cases, a user may login to an account using a conventional login process. After login, the user navigates to a page or location on a web site, block 604. This navigation is logged into a memory or data store. The data includes a URL or other identifier of the accessed page. It may be an identifier internal to the server platform. The log data also includes date-time stamps. This can be used to track the amount of time a user spends accessing the page. Specific details of these features may vary in different applications or software environments. For example, one embodiment may use timestamps to calculate elapsed time spent on a page or content item, while another embodiment may use software timers, triggered by interrupts or "event" messages, for that purpose.

We use the term "content item" here to refer broadly to a content resource that can be selected ("clicked") on a web page to view, interact with, or download it (or a combination of actions). A content item may comprise any one or more types of media, for example, a text document, web page, video clip, e-book; essentially any digital data source that can be used to convey information to a user. Generally, the user will be a person, but it could be a bot or the like. For example, a fund may utilize programmatic bots to "crawl the web" and collect and organize investment information. The bot might appear as a user on the subject web site, and its behavior collected, although some metrics would not apply to a non-human user.

On a page, the user clicks to open or access a content item, block 606. Here again, the item is identified, and the access logged, along with timestamp data. next, the server monitors and logs actions taken by the user, block 610, with regard to the content item; for example, open (reading) time, saving a copy, emailing the item, rating the item, clicking a link in the item, etc. These and other actions may be logged to build behavior data of the user with regard to the content item. Next, the user may navigate to a new content item, block 612. Decision 614 determines whether the new content item is on the same web page. If so, the algorithm loops back to block 606 to begin logging behavior with regard to the new content item. If not, the user may have navigated to a new web page. Decision 618 determines whether the new page is off the current site. If so, the process may terminate at 620. Before termination, the process may log the URL to which the user navigated. If the new page is on the same web site, the process may loop back to block 604 to begin logging user behavior on the new page. Some or all of this log data may be used to form behavior data to gauge user interests.

This data may be distilled to form an affinity map that identifies content items (by tags, semantic clusters, categories, etc.) of particular interest to the user relative to other content. In some cases, the user may be a financial advisor. The affinity map may shed light on the financial advisor's investment interests. The affinity map or aspects thereof may be stored in the data store in association with the corresponding user. In this way, queries may be executed on the data store to quickly identify funds or managers likely to be interested in a given securities product. The securities product may be associated or mapped to one or more tags, clusters, categories and correlations.

User Engagement and Subject Matter Scoring

Figure 7:
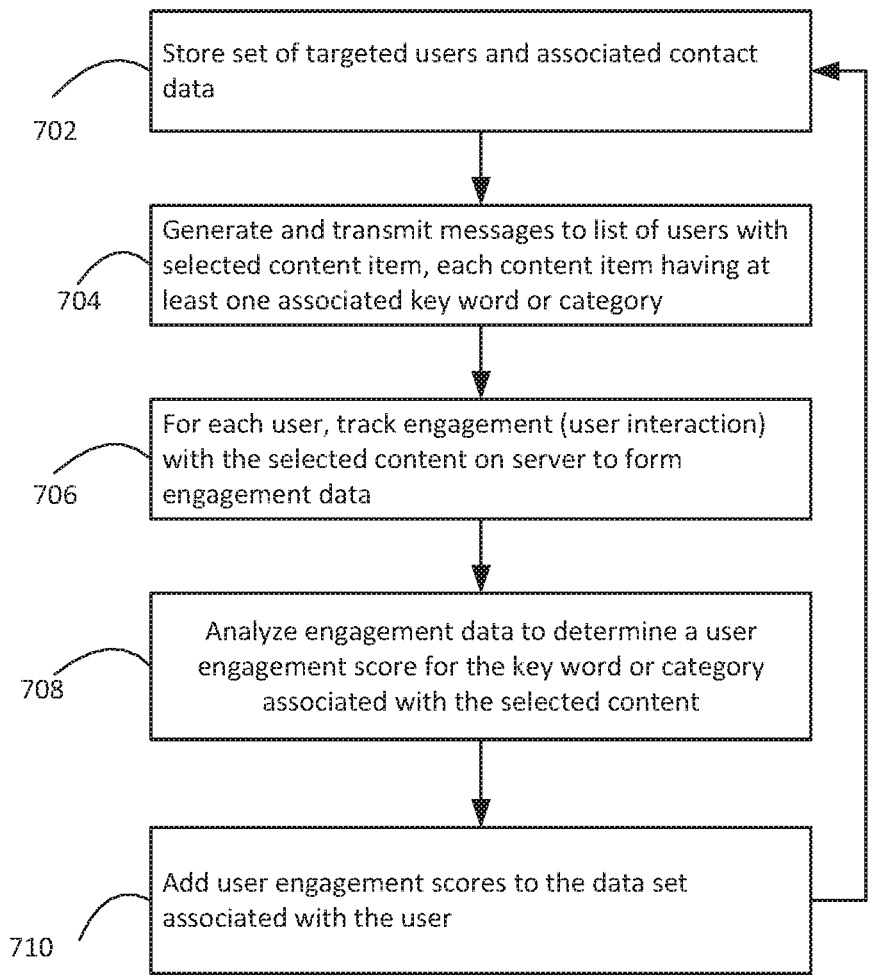
FIG. 7 is a simplified process diagram illustrating a method for building a database storing user engagement data relative to subject matter key words or categories, based on user engagement behavior collected in an interactive network server environment.

FIG. 7 is a simplified flow diagram of a process to develop a database that includes engagement scores for users. At block 702, the process begins with storing a set of targeted users and contact data, as mentioned above. At block 704, the process continues with generating messages and transmitting them to the list of users with selected content items, described in more detail with regard to FIGS. 2A-2B. Each content item transmitted (or linked in a message such as an email) has at least one associated key word or category.

Continuing at block 706, the process calls for tracking user interaction or engagement activity on the server relative to the content item and related items. This data is used to form engagement data. At block 708, the engagement data is analyzed to determine a user's engagement score associated with the content item—and by extension associated with the key word and/or category associated with the content item. At block 710, this engagement score may be added to the data set associated with the user to support querying the database as noted above.

A user's interest level in content items, or their subject matter, as demonstrated by the user's behavior, thus may be assessed and quantified in the engagement score. An engagement score may be determined as a combination (typically a linear combination) of multiple factors. Each factor may be scored relative to a key word or category. Each factor preferably would be weighted relative to other factors to develop an overall score. In use, a search or query of the data store may be used to identify interested users, based on searching for relative higher engagement scores, associated with selected content (by key words, categories, tags, etc.)

In one example, a scoring design may utilize scores of say 1-5 for each factor. A scoring system may use integer scores 1-5 in aggregate and for each factor (see below), with 5 being the highest level. These levels are not critical; the number of levels may vary in different applications. Weighting: each factor may be scored individually, and then the factors selected and combined to form an overall score. Each factor may be assigned a percentage (or relative weight) of the total score.

In some embodiments, factors to score may include but are not limited to one or more of the following factors. Next to each factor, a suggested relative weight is shown.

Categories in which the user read stories or other content items, 10%
Tags of the stories or other content items accessed, 35%
The order in which they clicked the stories or other content items, 5%
Stories or other content items within same semantic cluster that the user also clicked, 10%
Stories or other content items with related tags 10%
Frequency with which they read about these stories or other content items over a time period (e.g. 14 days)—10%
Number of times they clicked/loaded the same story or other content items—5%
If they rate the story or other content item on the site 4%
How they rate a story or other content item on site 1%
Number of times they opened the email containing that story or other content item 10%

This data may be collected on a server (for example, 120 in FIG. 1), based on interactions 532 of the user (for example, via terminal 520 in FIG. 5 or other network access device such as a "smartphone") following auto login as described above. The user interactions or behavior may be logged as described with regard to FIG. 6. Beginning from the raw log data, the items accessed by a given user are identified, and from the identification a set of characteristics or metadata of the items accessed is obtained. The content item metadata may include key words and/or categories and/or semantic clusters. An affinity map may be formed to summarize and optionally display the key words and/or categories and/or semantic clusters of content of greatest interest to the user. For example, the various actions logged with regard to the content items accessed can be processed, taking into account the date-timestamps, to determine some or all of the factors listed above. The factors may then be scored, based on the extent to which given activities imply user interest in the item content.

As a simple illustration, accessing say 15 content items having the same key words or assigned category over two days may earn a score of 5 with respect to those key words and/or that category. A more detailed analysis make take into account several or all of the factors listed above. The result is a metric of user interest, as demonstrated by the user's behavior, with respect to one or more key words, categories, tags, etc. The overall interest score may be weighted, for example, as shown above.

This data can be used to advantage in various ways. In one case, it may be used to narrow or filter an initial listing of potential users or targets. In some embodiments, the affinity map can be applied to product categories or a product salience metric (described below) in order to identify specific funds and/or content for which the target individual or population is likely to have a strong affinity.

Product Salience Metric

In some embodiments a product salience metric may be formed wherein a product is associated with categories using available data, analysis using AI, ML methods, other applicable methods, or any combination thereof, and additional factors are taken into account for comparison to the product. Factors considered in the product salience matrix may include one or more of fund pricing and fee information, theme, business or technological domain, realized returns, expected or targeted returns, information related to seasonal or cyclical performance or other statistically-derivable trends of the fund. The salience metric can be constructed by scoring one or more relevant or selected factors and applying a weighting matrix indicating relative importance of the factors to determine an overall score.

In one example, scoring may proceed by first, receiving or inputting category data for an investment product. This data may include, for example, fees, theme, and returns of the investment product. The product data may correspond to the characteristics in FIG. 4. This category data may be compared to the target user (a fund or financial advisor, for example) utilizing various factors. In one embodiment, the factors may include those listed below. They may be weighted, in this example, according to the percentages shown.

Time of year they tend to buy—7.5%
Average fee of funds held—27.5%
Categories of funds held—50%
Performance of funds held—10%
Fund rating—5%

To illustrate, the time of year factor may be a level 5 or maximum value, if the present time of year is the time that the target user tends to buy a new investment. The value would decrease as the present time is further away from the time that the target user tends to buy a new investment. Considering the average fee of funds held by the target fund, a neutral level (say 2.5 out of 5) may be assigned if the product fees are substantially equal to the average fee of funds held by the target fund. A higher level may be assigned to this factor if the product fees are lower than the average fees, and so on, comparing performance, ratings, and potentially other factors, and assigning a score to each factor based on the comparison. Additional factors that may be considered include previous readership activity, that is, the target user's activities or behavior on the server site. For example:

Has the user ever engaged (clicked) with dedicated emails before 7.5%

Has the user ever bought a fund from a dedicated email 10%

How did this user behave before he was approached and bought the last fund 10%

How many clicks on a tag over a time frame leading up to a purchase

How many clicks on related tags over a time period.

One scoring design uses a 1-5 scale in the aggregate and for each factor, 5 being the highest score. Each factor preferably may be weighted, that is, assigned a percentage of the total score. Representative weights are shown above with each factor. The overall score, the product salience metric, gives an indication of salience or "fit" of the product to the target fund, taking into account the target fund characteristics, product characteristic, and actual behavior.

Tuning the Relative Weights of Product Salience Factors

Figure 9:
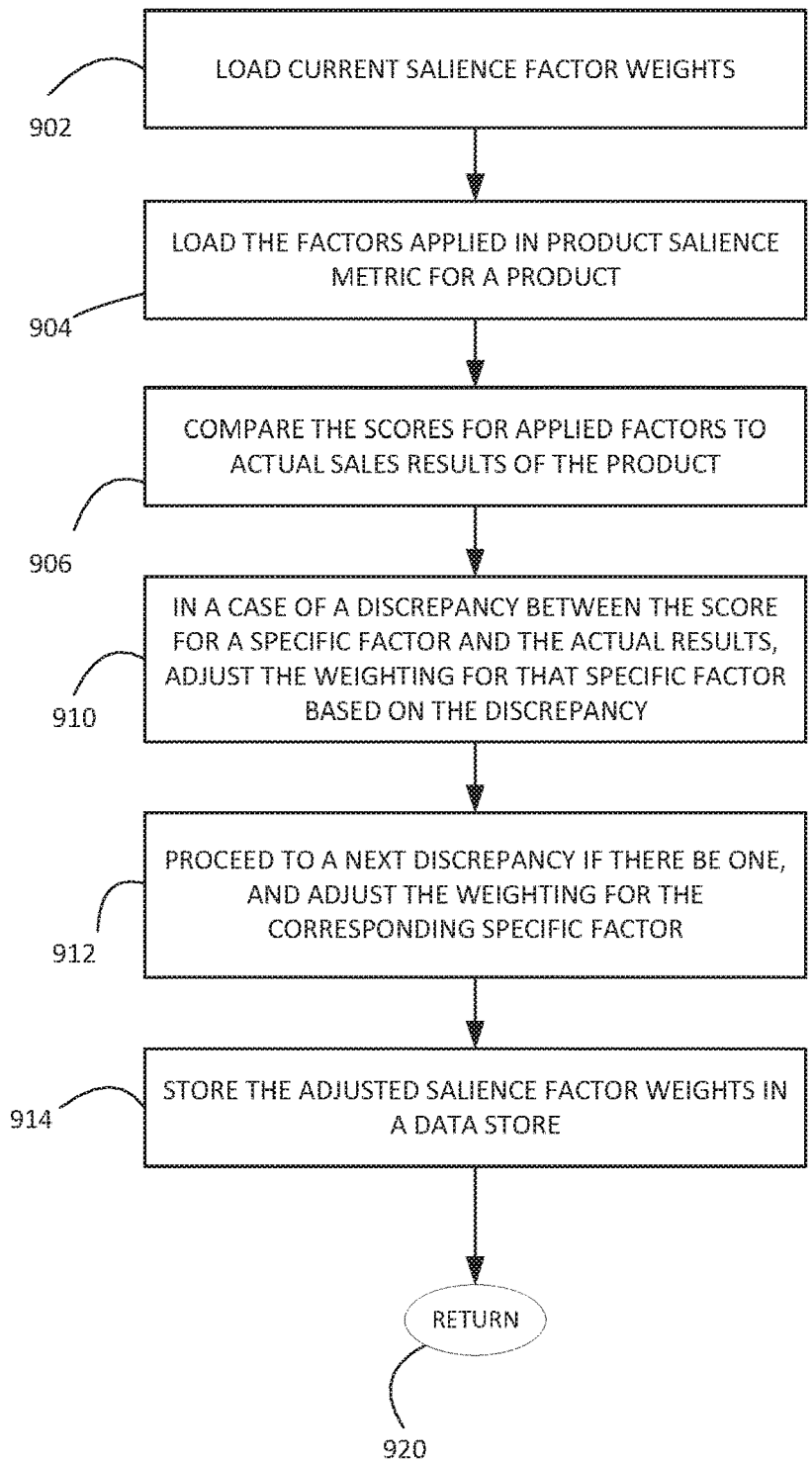
FIG. 9 is a simplified flow diagram of an example process for tuning relative weights of product salience factors.

The nominal or suggested weights given above may be adjusted or "tuned" based on actual results. By "actual results," we refer to actual trades of the product or other investments. FIG. 9 illustrates one example of a process or algorithm for tuning the weights. In block 902, the current salience factors weights are accessed or loaded for processing, for example, in a server. In block 904, data is accessed comprising the specific factors and scores applied in a forming a salience metric for a product. The salience metric (a combination of the factors) for a product may be determined relative to a specific user or fund. At block 906, a process, preferably executed by a processor using software, compares the previously determined scores to the actual sales results for the product. Each factor is considered separately, or factors may be combined. Then, at block 910, in the case of a discrepancy between the score for a specific factor and the actual results for the product, adjusting the weighting for that specific factor based on the discrepancy.

For example, suppose a target user or fund characteristics show that they tend to add a new product in the first quarter of the calendar year ("Q1"). And the current date is not in Q1. Thus, this factor (which might be called time of year) is given a low score of say, 2 out of a possible 5 (2/5). However, the actual sales results show the target fund did in fact purchase the product (outside of Q1). This discrepancy is detected, and the weighting applied to the "time of year" factor for this user is lowered. The specific score (2/5) is not changed; it might be considered deterministic. Rather, the weighting change reduces the influence of this specific factor in the overall salience metric.

In the same example, it may be determined from the system data store that three targeted emails were sent to the target fund in Q3, and the fund purchased the product soon after those emails. (The automatic login feature can confirm that they were read.) Here, depending on the score attributed to the emails, the weighting of that emailing factor may be increased, based on the purchases and their timing proximate to the emails.

In some embodiments, one or more of the factors may pertain to alignment or correlation between the subject matter of a product, as identified by key words, categories, etc. to the interests of a user or fund, and reflected in the user behavior. The user interests may be expressed in an affinity map, described above. An alignment between the product subject matter and user affinity map may be one of the salience factors scored. And the weighting of that subject matter factor may be adjusted if it appears inconsistent with actual results. If that subject matter factor has a high score for example, but actual purchases are lacking, the relative weight of the factor in the overall salience may be reduced. Correlation across multiple variables can be calculated in various ways. Using a multi-dimensional vector approach, for example, a Euclidean distance between vectors can be used an a correlation metric.

At block 912, the process may continue to analyze the data to detect another discrepancy, if there be one among the applied factors, between a factor weighting and the actual results. In that case, the process adjusts the weighting for the corresponding specific factor. The process may essentially loop through the factors applied to the subject (target fund, product) pair. Upon conclusion, the results (weight adjustments) are stored in a data store, block 914, and the process terminates at 920.

Figure 10:
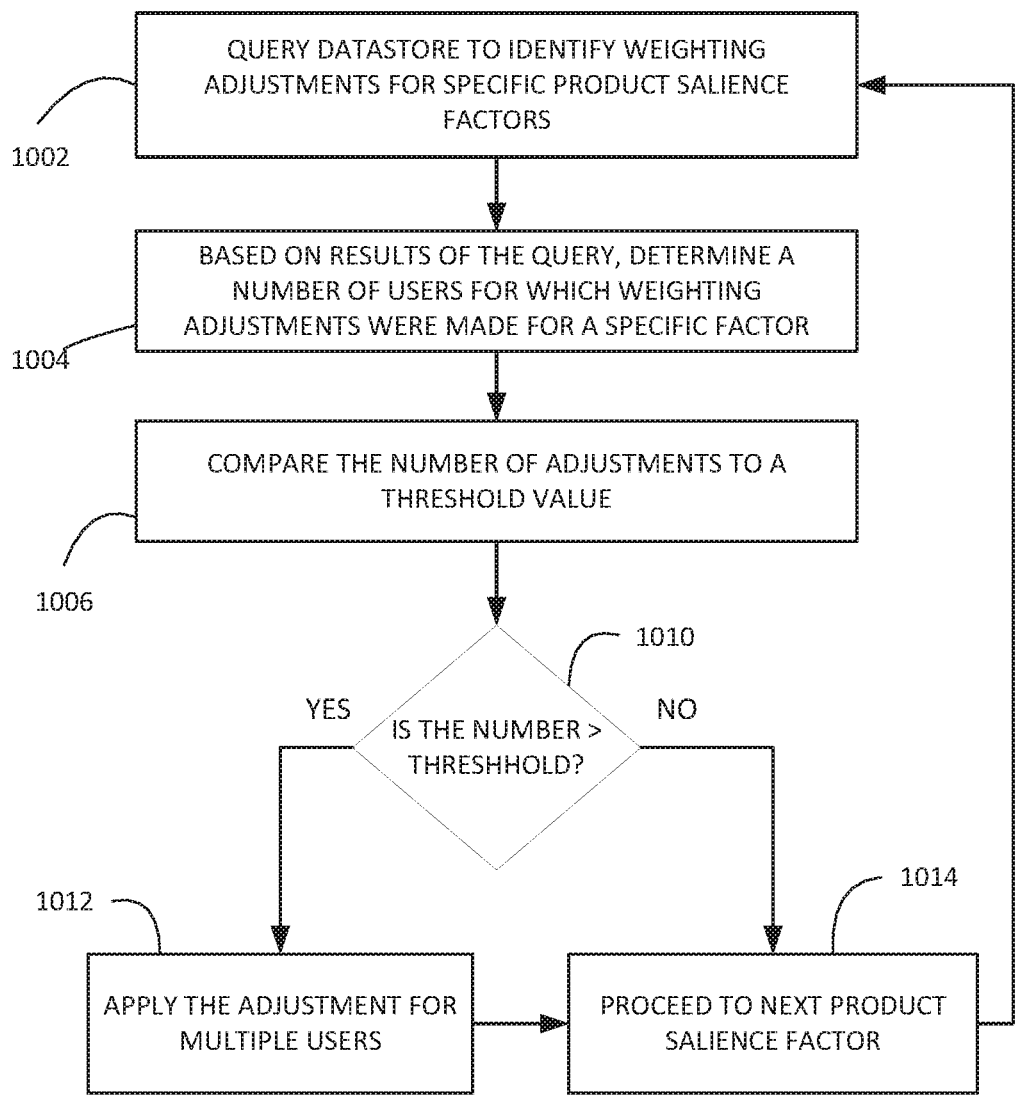
FIG. 10 is a simplified flow diagram of an example process for conditionally applying weighting adjustments for specific product salience factors.

In some embodiments, the weighting adjustments just described may be extended, in some cases, to a broader set of users. In this way, more accurate salience metrics may be generated, without analyzing each user separately. FIG. 10 illustrates a process or algorithm for that purpose. At block 1002, a query is submitted to a data store that contains the weighting data including the adjustments described above. At block 1004, based on the results returned, the process counts a number of users-funds for which weighting adjustments were made for one or more specific salience factors. At block 1006, that count is compared to a threshold value. For example, the threshold may be determined as a fraction of the total number of users-funds in the database. Or, as a fraction of the previously generated salience metrics. at decision 1010, if the count exceeds the threshold value, then the adjustment may be applied to set of multiple users, potentially all users, in the system. It may be applied to a subset of users depending on selected characteristics. If the count is less than the threshold value, the process proceeds to analyze the next salience factor, block 1014, and loop back to block 1002.

Figure 8A:
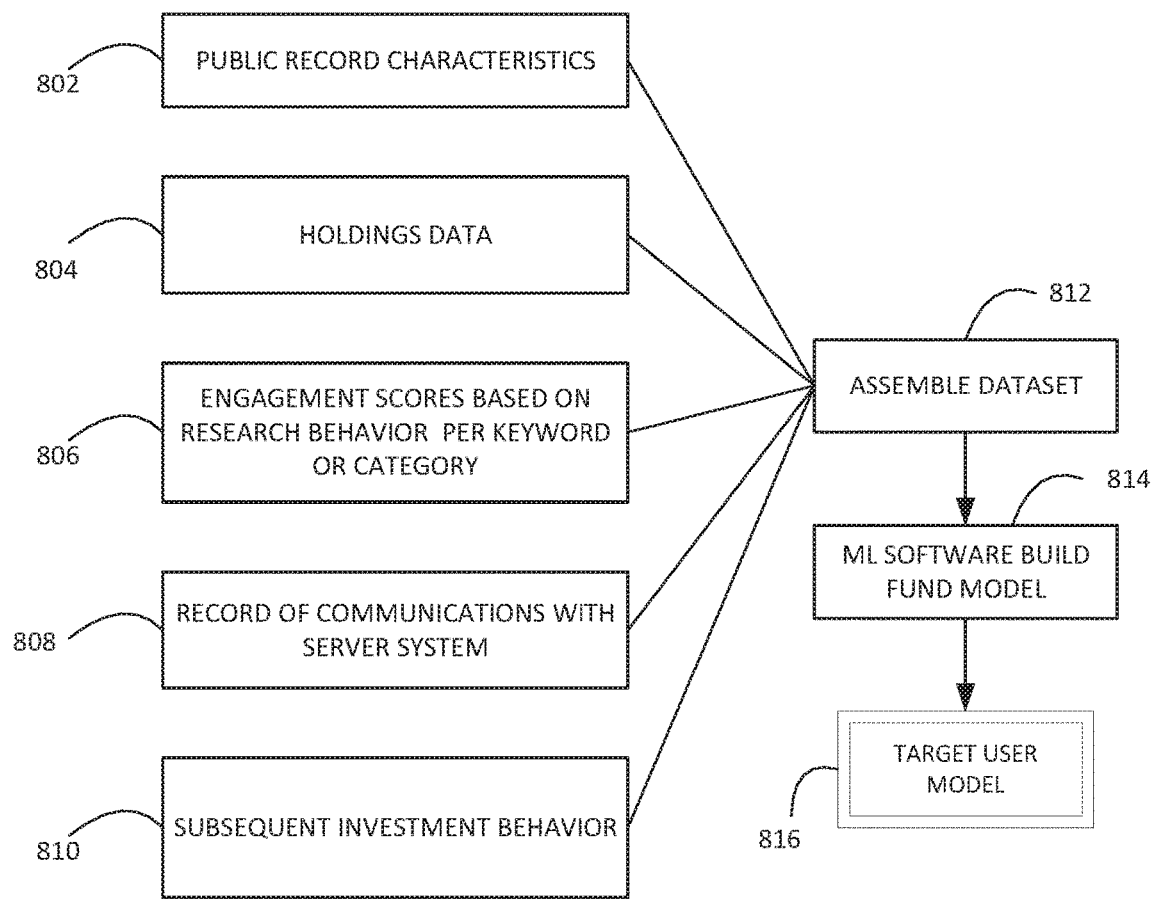
FIG. 8A is a simplified conceptual diagram for applying machine learning (ML) to build a model of a fund utilizing data sources described herein.

FIG. 8A is a simplified conceptual diagram for applying machine learning (ML) technology to build a model of a fund utilizing data sources described above. In the figure, various data sources described above are used to assemble a dataset descriptive of a given fund. These sources may include, for example, public records 802 such as SEC filings, prospectuses, etc. Block 804 contains holdings data, which may include purchase and sale transactions, which in turn may further include purchase and sale dates, quantities, prices, etc. Another source is the engagement or "behavior" data, represented by block 806, referring to behavior of a target fund or manager on the server site. For example, see FIG. 6. A related source is records of communications, block 808, as between the server and the target user, such as emails and link "clicks." A further relevant source is investment behavior of the target user after interactions with the server, block 810. This may be subsumed in the holdings data, block 804. Timing is important, and timestamps should be included for relating investment behavior to the server interactions or research behavior.

Figure 8B:
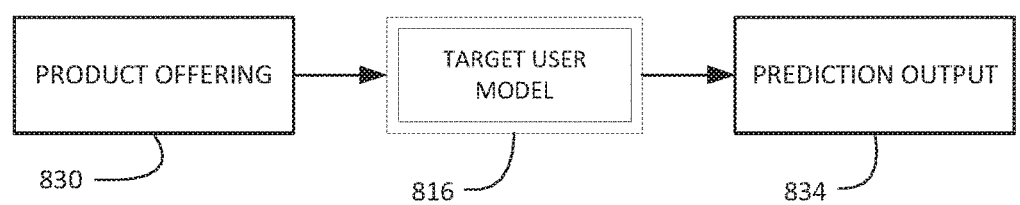
FIG. 8B is a simplified flow diagram for utilizing an ML model of a fund for predicting investment behavior of the fund.

FIG. 8B is a is a simplified flow diagram for utilizing an ML model of a fund for predicting investment behavior of the fund. Here, data 830 descriptive of a product offering, such as the categorical data described above, may be input to an ML model 816 of a target fund. The model may be utilized to generate predictions of the target fund behavior, including a prediction (likelihood or classification yes/no) of the fund investing in the product offering. More generally, the model can be used to identify the most important or predictive variables or factors in the funds behavior. To that end, interactive visualization of models can be used as described in U.S. Patent Application Publication 2017-0032026 (BigML, Inc.). The identified factors may be helpful in designing or marketing a new product.

It will be obvious to those having skill in the art that many changes may be made to the details of the above-described embodiments without departing from the underlying principles of the invention. The scope of the present invention should, therefore, be determined only by the appended claims.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method comprising:
provisioning an internet server and a data store accessible to the server, wherein the server is programmed to—
access a list of users stored in the data store, wherein the list of users includes at least a corresponding email address or other unique identifier for each of the users;
"for at least one user on the list of users—
without receiving a request from the user, generate a custom link (or URL) that links to a corresponding target web page or content item accessible on the server;
without receiving a request from the user, transmit the custom link to the user in the body of, or in an attachment to, an email addressed to the user's email address,
wherein the email is initiated by the server;
detect a remote browser access to the target web page or content item corresponding to the custom link;
based on the detected access, identify the user;
auto-login in the identified user to the server to enable the user to access server resources without requiring the user to input any name, account identifier, password or take any other authentication or login action; and
after auto-login, monitor and log the user's interactions on the server.

2. The method of claim 1 wherein monitoring and logging the user's interactions includes identifying at least one content item accessed by the user and logging a start time and/or duration of the user access to the content item.

3. The method of claim 2 wherein the server is further programmed to—
store the logged user interaction data in the data store in association with the identified user;
analyze the stored interaction data to form behavior data associated with the identified user;
store the behavior data in a data store in association with the identified user; and
based on the stored behavior data, identify at least one key word and/or category to identify subject matter apparently of interest to the identified user.

4. The method of claim 3 wherein the server is further programmed to—
analyze the stored behavior data of the identified user to form an engagement score relative to at least one key word and/or category; and
store the engagement score in the data store as a metric of user affinity or interest in subject matter corresponding to the key word and/or category.

5. The method of claim 4 wherein forming the engagement score includes:
assigning an individual score to at least some of the following factors, relative to the key word and/or category—
categories in which the user read content items in the server;
tags of the content items read by the user on the server;
a sequence in which the user clicked content items;
additional content items accessed by the user within same category;
content items with related tags accessed by the user, wherein related tags are tags falling within a common predetermined group of tags;
a frequency with which the user accessed (clicked) the content items over a selected time period;
a number of times the user clicked/loaded/accessed the content item corresponding to the custom link;
whether the user rated the content item corresponding to the custom link on the server site
a rating assigned by the user to the content item corresponding to the custom link;
a number of times the user opened the email containing custom link;
and then aggregating the individual scores to form the overall engagement score for the user relative to the key word and/or category.

6. The method of claim 5 wherein aggregating the relative scores includes weighting each of the relative scores according to a predetermined relative weight assigned to the corresponding factor; and then summing the weighted scores to form overall engagement score for the user relative to the key word and/or category.

7. The method of claim 6 wherein the relative weights assigned to the corresponding factors comprise approximately the following percentages of the overall engagement score:
categories in which the user read content items in the server 10%;
tags of the content items read by the user on the server 35%;
a sequence in which the user clicked content items 5%;
additional content items accessed by the user within same category as the custom link 10%;
content items with related tags accessed by the user, wherein related tags are tags falling within a common predetermined group of tags 10%;
a frequency with which the user accessed (clicked) the content items over a selected time period 10%;
a number of times the user clicked/loaded/accessed the content item corresponding to the custom link;
whether the user rated the content item corresponding to the custom link on the server site 4%
a rating assigned by the user to the content item corresponding to the custom link 1%;
a number of times the user opened the email containing the custom link 10%.

8. The method of claim 4 wherein the server is further programmed to—
select a securities investment product;
assign at least one key word and/or category to the selected product;
query the data store based on the assigned key word and/or category to obtain a result, the result identifying user records in the data store having an engagement score relative to the assigned key word and/or category;
based on the identified user records and the corresponding engagement scores, generate a ranked listing of users based on their respective engagement scores;
select one of the users based on a highest-ranking engagement score relative to the assigned key word and/or category; and
direct a communication associated with the investment product to the selected user at the stored email address.

9. The method of claim 8 wherein the server is further programmed to:
receive an indication that the user to whom the communication was directed subsequently purchased the investment product; and
update the corresponding user data in the data store based on the indication.

10. The method of claim 9 wherein the indication is obtained by the server querying online public records.

11. The method of claim 4 wherein the server is further programmed to—
based on the stored behavior data, determine one or more key words and/or categories and/or semantic clusters of content of interest to the user;
query the datastore based on the determined key words and/or categories and/or semantic clusters of content to identify at least one matching record associated with a product; and
designate the user as a target to receive electronic communications associated with the product.

12. The method of claim 4 wherein the server is further programmed to—
access stored characteristics data for a selected product;
access stored characteristics data for a target fund, the fund characteristics data including at least some factors in common with the characteristics data for the selected product;
for each factor common to the product characteristics and the target fund characteristics, compare the corresponding factors, and assign a score to the common factor based on the comparison;
determine a salience metric total score based on the assigned common factor scores; and
store or update a corresponding record in the data store associated with the target fund to identify the selected product and indicate the salience total score.

13. The method of claim 12 wherein determining the salience total score includes weighting the common factor scores and combining the weighted common factor scores to form the salience total score.

14. The method of claim 13 wherein the target fund characteristics data for comparison to the product characteristics data include at least some of the following characteristics:
Time of year the target fund tends to buy a product,
Average fee of funds held by the target fund,
Categories of funds held by the target fund,
Performance of funds held by the target fund, and
Rating of the target fund.

15. The method of claim 14 and further comprising tuning the corresponding salience factor weighting for at least one of the individual factor scores by:
comparing the factor score to actual sales results of the product;
based on the comparison, detecting a discrepancy between the factor score and the actual sales results;
responsive to the discrepancy, adjusting the weighting for the factor to modify its relative influence in computing the salience total score; and updating the salience factor weights stored in the data store to reflect the adjustment.

16. The method of claim 15 and further comprising:
querying the datastore to identify weighting adjustments for a specific product salience factor;
based on results of the query, determining a number of target funds for which weighting adjustments were made for the specific factor;
compare the number of adjustments to a predetermined threshold value; and
in a case that the number of adjustments exceeds the threshold value, applying the adjustment to additional funds in the data store.

17. A system comprising:
a server provisioned for network communications;
a data store accessible to the server;
a list of target users stored in the data store, the list including an email address for each of the target users; and
software stored in non-volatile memory and executable on the server to—
  generate a custom link or URL that links to a target web page or content item accessible on the server;
  select one of the target users on the list;
  automatically generate an email;
  insert the custom link into the email or into an item attached to the email;
  transmit the email to the selected target user over a network;
  detect a remote browser access to the target web page or content item corresponding to the custom link;
  based on the detected access, identify the selected target user;
  auto-login the identified user to the server to enable the user to access server resources without requiring the user to input any name, account identifier, password or take any other authentication or login action;
  after auto-login, monitor and log the identified user's interactions on the server to form behavior data; and
  store the behavior data in the data store in association with the identified user.

18. The system of claim 17 wherein the software further causes the server to—
  analyze the stored behavior data to form affinity data that identifies subject matter by at least one key word and/or category and/or semantic cluster;
  store or update a record associated with the user in the data store to reflect the affinity data.

19. The system of claim 18 wherein the software further causes the server to—
  access product characteristic data that includes at least one key word and/or category and/or semantic cluster associated with a product;
  query the data store to obtain a result based on matching the product characteristic data;
  based on the result of the query, identify at least one user likely to have an affinity for the product; and
  store or update a record associated with the identified user in the data store to identify the product as a candidate for purchase.

20. The system of claim 19 wherein the user is a target fund, advisor or manager, and the fund characteristics data for comparison to the product characteristics data include at least some of the following characteristics:
Time of year the target fund tends to buy a product,
Average fee of funds held by the target fund,
Categories of funds held by the target fund,
Performance of funds held by the target fund, and
Rating of the target fund.

* * * * *